United States Patent
Diethorn

(10) Patent No.: US 8,126,394 B2
(45) Date of Patent: Feb. 28, 2012

(54) PURPOSEFUL RECEIVE-PATH AUDIO DEGRADATION FOR PROVIDING FEEDBACK ABOUT TRANSMIT-PATH SIGNAL QUALITY

(75) Inventor: Eric John Diethorn, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 960 days.

(21) Appl. No.: 12/119,984

(22) Filed: May 13, 2008

(65) Prior Publication Data

US 2009/0285367 A1 Nov. 19, 2009

(51) Int. Cl.
*H04B 7/14* (2006.01)
*H04B 17/00* (2006.01)
*H03C 1/04* (2006.01)

(52) U.S. Cl. ...................... 455/24; 455/115.4

(58) Field of Classification Search ................ 379/1.01, 379/9, 10.01, 10.02, 15.01, 22.02, 22.08, 379/27.01, 27.02, 27.04, 28, 29.01, 29.02, 379/29.1, 32.01; 704/200, 224, 226, 231, 704/233, 234, 270; 455/24, 115.1, 115.4
See application file for complete search history.

(56) References Cited

U.S. PATENT DOCUMENTS

| | | | |
|---|---|---|---|
| 6,304,634 B1* | 10/2001 | Hollier et al. | 379/22.02 |
| 6,389,111 B1* | 5/2002 | Hollier et al. | 379/28 |
| 7,751,431 B2* | 7/2010 | Engelsma et al. | 370/466 |
| 7,831,025 B1* | 11/2010 | Francis et al. | 379/1.01 |
| 2006/0073786 A1* | 4/2006 | Sarkar | 455/24 |
| 2009/0149139 A1* | 6/2009 | Harel et al. | 455/101 |

* cited by examiner

*Primary Examiner* — Binh Tieu

(57) ABSTRACT

A technique applicable to a telecommunications system is disclosed that provides quality-related information in a receive path, in which the information serves as feedback about the call quality that is present in the corresponding transmit path. It is recognized that when a first party on a call hears degradation, he tends to change the way that he speaks or reacts to a second party. Based upon this recognition, the present invention addresses the problem of one-way degradation by providing a feedback signal to the first party, in the form of intentional degradation of the voice signals that he is receiving from the second party. The degradation that is introduced by the disclosed data-processing system is based on the current quality of the voice path from the first party to the second party (i.e., the transmit path), instead of the other way around (i.e., the receive path).

20 Claims, 3 Drawing Sheets

PURPOSEFUL RECEIVE-PATH AUDIO DEGRADATION FOR PROVIDING FEEDBACK ABOUT TRANSMIT-PATH SIGNAL QUALITY

FIELD OF THE INVENTION

The present invention relates to telecommunications in general, and, more particularly, to providing information in a receive communication path to a user, wherein the information serves as feedback about the signal quality in the corresponding transmit communication path.

BACKGROUND OF THE INVENTION

Certain types of audio telephony are susceptible to degradations in voice quality. For example, cellular telecommunications is notorious for marginal-to-poor call quality at certain times of the day and year, and in certain geographic areas where coverage is a problem.

In one sense, the problem is particularly annoying when one of the communication paths between two call participants is afflicted with poor call quality at a particular moment, while the other path still has acceptable quality. This occurs frequently in cellular telecommunications, in which the uplink path (i.e., from the phone to the radio base station) and the downlink path (i.e., from the radio base station to the phone) are often RF-engineered differently from each other. A consequence of this difference in the engineering between the two transmission links is that the call quality might also be asymmetrical at times during a call.

Where asymmetry in the call quality is present, for example, a first call party on a cell phone call might continue to speak for several seconds before realizing that some or all of what he was just saying was not clearly heard by the second call party. The first party then has to figure out what was missed by the second party and repeat some or all of what was said. This is a situation that virtually every cell phone user has experienced at least once, and one that has often resulted in frustration and lost time.

Various approaches in the prior art have been devised to address the problem of asymmetry between call participants. One such approach involves the use of military communication protocol, in which explicit repetitions and special words are used throughout a conversation. The advantage of this approach is that it can be used by the call participants irrespective of the underlying nature of the communication system (e.g., Public Switched Telephone Network [PSTN], Voice over Internet Protocol [VoIP], cellular, etc.). The disadvantage is that most call participants would find the use of repetitions and special words to be cumbersome.

In another approach, an evaluation device is installed inline of the handset at one of two communication points. The device determines the Perceptual Evaluation of Speech Quality (PESQ) Mean Opinion Score (MOS) by sending a known voice stream in each of the two directions of communication. SAGE Electronics, for example, sells such a device. Disadvantageously, however, PESQ is an obtrusive testing method in the sense that the voice channel cannot be used for speech communications during the use of the evaluation equipment.

Yet another type of approach involves the use of ITU standards P.562 and P.563, which deal with measuring and analyzing voice quality. They specify software to analyze audio from live calls and to give the audio an MOS score that predicts how a panel of test experts would rate a call. Methods using these standards would be unobtrusive, in that they would operate on live voice waveforms and would not alter speech communications quality. Disadvantageously, however, these standards appear to be too complex to justify their implementation in mass-produced endpoints.

Elements of a possible approach exist in the information sent by the Real-time Transport Control Protocol (RTCP), which is used to report reception quality to the remote communication endpoint in VoIP applications. The advantage of an approach if based on RTCP data is that it would rely on a standard protocol. RTCP data, however, is not used to provide an explicit feedback of the quality to the call participants themselves, in part because RTCP was designed to feed a system (e.g., an endpoint) which eventually could adjust a communication codec so as to achieve better call quality. Even that objective, however, does not yet appear to have been met. And in any event, the RTCP data might not be sufficient to prove that the adjusted call quality is adequate.

What is needed is a technique, without some of the disadvantages in the prior art, to provide feedback to a first call participant about whether he is being adequately heard by a second call participant.

SUMMARY OF THE INVENTION

It is recognized in the present invention that when a first party on a call hears degradation, he tends to change the way that he speaks or reacts to a second party, at least at that moment. Either he speaks more slowly or more clearly, or he tries to confirm that the second party is able to hear him—for example, by sporadically asking, "Can you hear me?" or "Are you still there?" Based upon this recognition, the present invention addresses the degradation problem by providing quality-related feedback to the first party, in the form of intentional degradation of the voice signals that he is receiving from the second party.

The degradation that is introduced by the data-processing system of the illustrative embodiment is based on the current quality of the voice path from the first party to the second party (i.e., the transmit path), instead of the other way around (i.e., the receive path). The degradation can be introduced in the receive path in such a way that it becomes noticeable, but does not affect the first party's ability to understand the second party. For example, crackling can be introduced during quiet periods in the second party's voice activity, so that the first party can still hear what the second party is saying. In another example, synthetic but natural-sounding noise can be added to the speech signal from the second party, with the level of noise that is added being a function of the quality of the transmit communications path. Intentional degradation of the voice signals in the receive path is advantageous over the use of non-audio cues, in that the first party probably is either holding the handset to his ear or using the handset in hands-free mode, and consequently might not notice, for example, indications on the handset's display.

The feedback signal that is transmitted to the first party can be introduced at a point in the network where it can determine whether there is adequate call quality in the first party's transmitted voice signals. When the network detects that the call quality is inadequate or deteriorating, it can introduce purposeful degradation to the receive path. The network can introduce the degradation when the first party is either speaking or silent, or when the second party is either speaking or silent, alone or in combination with each other.

In accordance with the illustrative embodiment, the degradation is introduced by the data-processing system prior to the encoding and transmitting of the feedback signal to the first party. In some alternative embodiments, however, a control signal is instead transmitted to the first party's terminal, which signal conveys degradation information or instructions for the terminal to use in creating degradation. The first party's terminal then uses the control signal it receives to create the degradation itself.

The telecommunications terminals in the illustrative embodiment exchange, with each other, audio bitstreams that represent audio signals, in which the terminal that is to receive the feedback signals is a cell phone. The illustrative embodiment features a cell phone because it is particularly vulnerable to impairments in signal quality that are introduced by the air-interface links. However, it will be clear to those skilled in the art, after reading this specification, how to apply some or all of the described tasks to telecommunications systems that involve the exchange of other types of media content such as video, that involve more than two terminals communicating with one another, or that involve different types of terminals than those in the illustrative embodiment.

The illustrative embodiment of the present invention comprises: receiving, at a data-processing system, a bitstream that represents a media signal originating from a first telecommunications terminal being used by a first user, at least some of the bits in the bitstream being transmitted to a second telecommunications terminal being used by a second user; generating a quality statistic that is based on at least a portion of the bitstream received; and transmitting, to the first telecommunications terminal, a feedback signal that conveys information perceivable by the first user in the form of degradation being introduced to a pre-existing signal originating from the second telecommunications terminal, the feedback signal being based on the quality statistic, whereby the information conveyed provides the first user with feedback on the signal quality being experienced by the second user.

DETAILED DESCRIPTION

Figure 1:
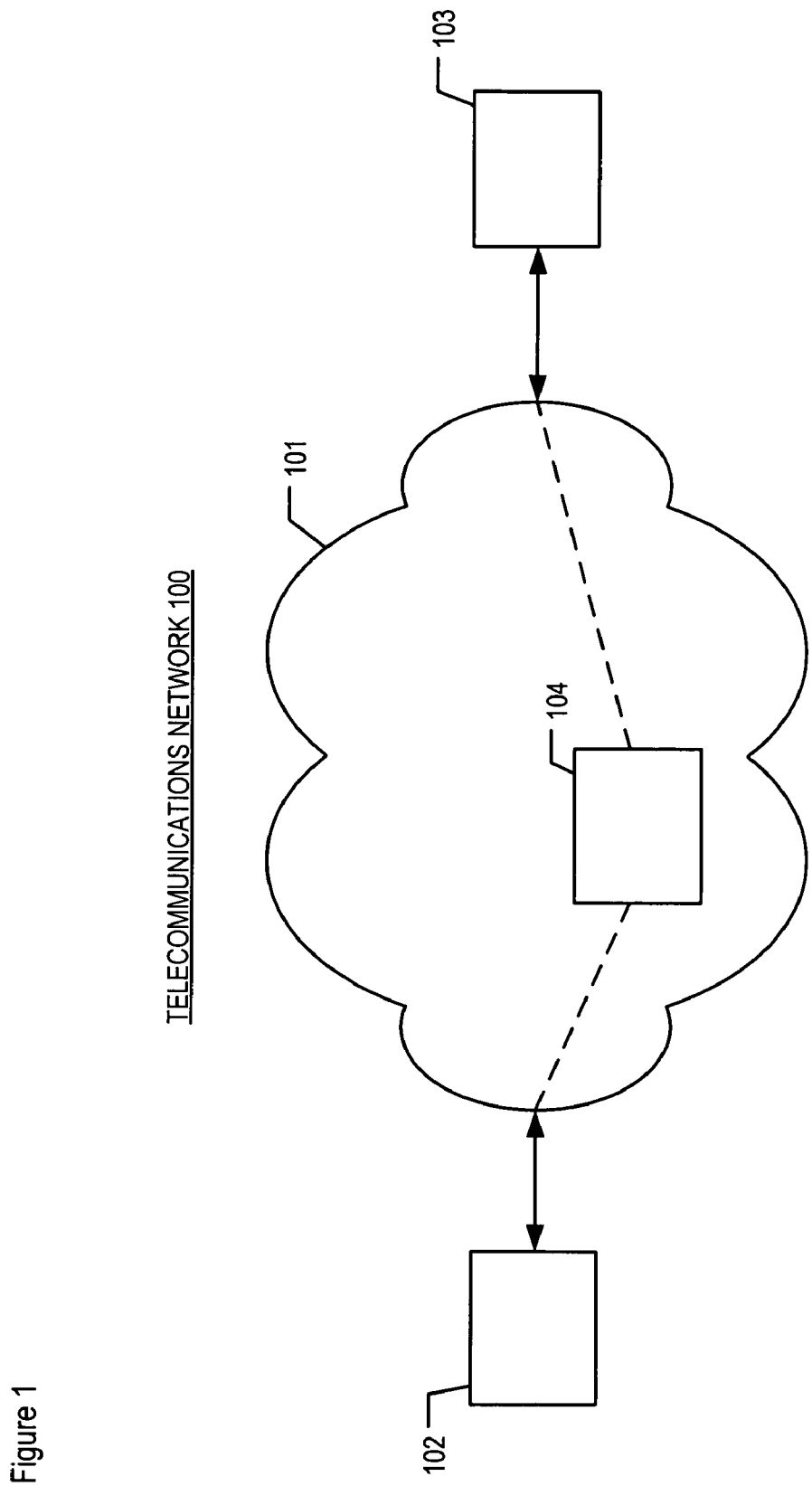
FIG. 1 depicts a schematic diagram of telecommunications system 100 in accordance with the illustrative embodiment of the present invention.

FIG. 1 depicts a schematic diagram of telecommunications system 100 in accordance with the illustrative embodiment of the present invention. System 100 comprises telecommunications network 101; first telecommunications terminal 102; and second telecommunications terminal 103. The elements in system 100 are interconnected as shown.

Telecommunications network 101 enables the transport and control of bitstreams between endpoints such as terminals 102 and 103. The bitstreams represent encoded media, such as audio, video, and so forth. To this end, network 101 comprises one or more interconnected data-processing systems such as switches, servers, routers, and gateways, as are well-known in the art. Network 101, for example, comprises data-processing system 104, which is described below and with respect to FIG. 2.

In accordance with the illustrative embodiment, network 101 comprises an Internet Protocol-based (IP-based) network, as is known in art, for the purpose of transporting voice signals. Although network 101 in the illustrative embodiment comprises a Voice-over-IP (VoIP) service provider's network, network 101 could alternatively or additionally comprise another type of network such as the Internet, some other type of IP-based network, or some other type of packet-based network, as those who are skilled in the art will appreciate. Additionally, it will be clear to those skilled in the art, after reading this specification, how to make and use alternative embodiments of the present invention in which media other than audio is controlled and transported from one terminal to another.

Telecommunications terminals 102 and 103 are endpoint devices, such as desksets, cellular phones, soft phones resident in computers, personal digital assistants, and so forth. Each of terminals 102 and 103 enables their users to communicate with each other, or with users of other terminals supported by network 101 that are not depicted. Accordingly, terminals 102 and 103 interoperate with network 101 and with each other in well-known fashion.

Terminal 102, in accordance with the illustrative embodiment, is a cell phone, which is particularly vulnerable to impairments in signal quality, mainly because of the RF-engineering of the air-interface link between the terminal and the network infrastructure (i.e., a radio base station that is a part of network 101). It will be clear to those skilled in the art, however, how to make and use alternative embodiments of the present invention, in which terminal 102 is a type of terminal other than a cell phone, such as a wireline office deskset. And as those who are skilled in the art will also appreciate, embodiments of the present invention can be made and used in which the terminals of system 100 operate in various types of networks such as public networks, private networks, and so forth.

In accordance with the illustrative embodiment, the present invention is directed at a technique that provides, to a first user at a first terminal, feedback on the signal quality being experienced by a second user at a second terminal, wherein both users are humans. In various alternative embodiments, however, the first user might be human and the second user might be a machine, or the first user might be a machine and the second user might be human, and so forth.

Data-processing system 104 is a communications server that performs one or more functions that enable proper communication between a first and second user. The salient components of system 104 that enable this communication are described below and with respect to FIG. 2. System 104 also performs the tasks of the illustrative embodiment, the salient tasks being described below and with respect to FIG. 3.

In accordance with the illustrative embodiment, data-processing system 104 is a communications server in the communications path that is traversed by the first bitstream flowing from terminal 102 to terminal 103, or by the second bitstream flowing from terminal 103 to terminal 102, or by both bitstreams. As those who are skilled in the art can appreciate, however, system 104 can be provided with at least some of the bits in the first and/or second bitstream by another data-processing system, in some alternative embodiments. In some other alternative embodiments, the functionality of data-processing system 104, as it pertains to the present invention, can be provided by terminal 103 or another terminal.

Figure 2:
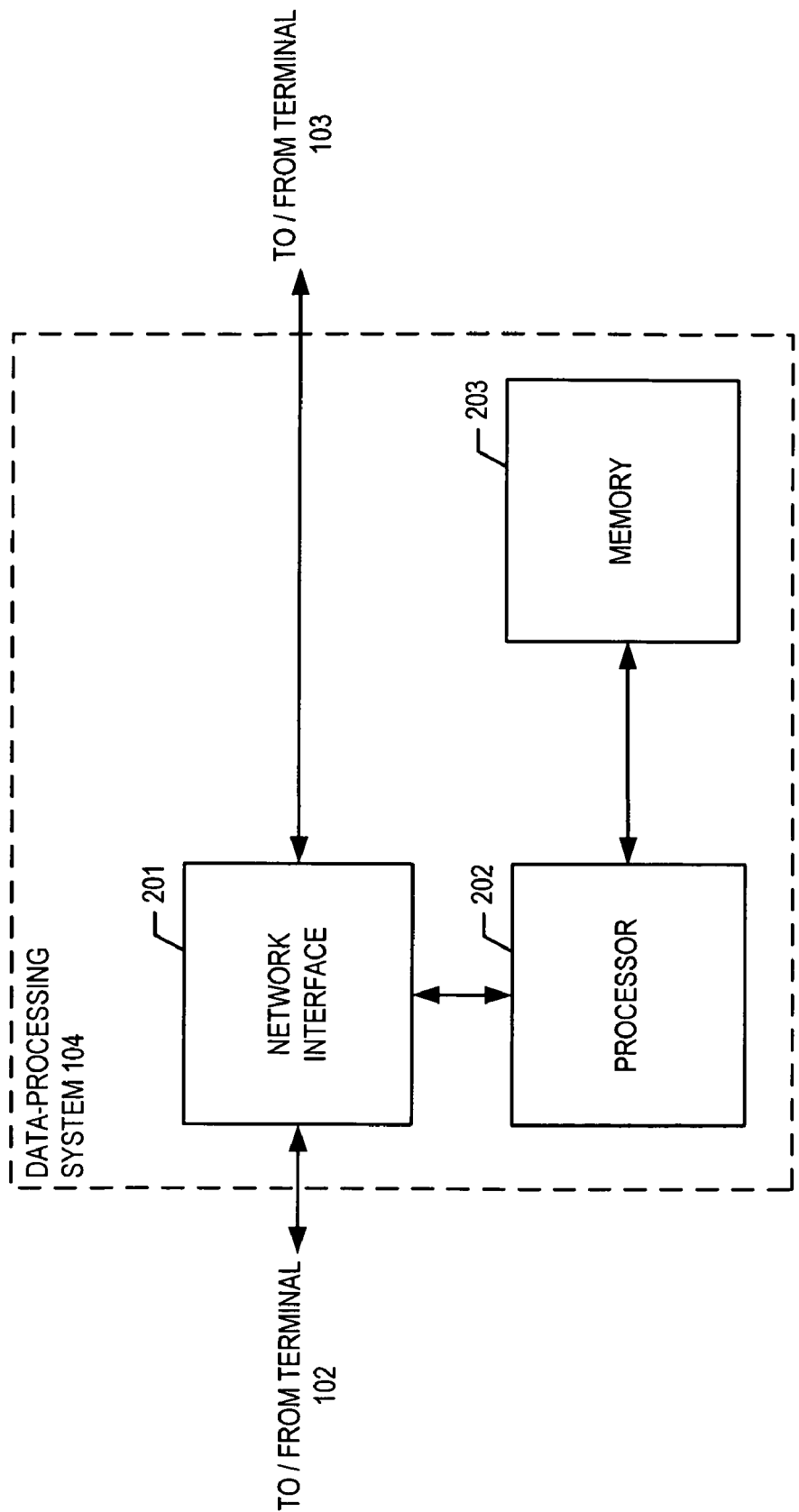
FIG. 2 depicts the salient components of data-processing system 104, which is part of telecommunications system 100.

FIG. 2 depicts the salient components of data-processing system 104, in accordance with the illustrative embodiment of the present invention. System 104 comprises network interface 201, processor 202, and memory 203, interconnected as shown. It will be clear to those skilled in the art, after reading this disclosure, how to make and use alternative embodiments of the present invention in which system 104 comprises any subcombination of the components listed above.

Network interface 201 comprises the circuitry that enables system 104 to receive signals from and transmit signals to any terminal, such as terminals 102 and 103, in well-known fashion.

Processor 202 is a general-purpose processor that is capable of receiving information from and transmitting information to network interface 201, of executing instructions stored in memory 203 including those that correspond to the tasks of the illustrative embodiment, and of reading data from and writing data into memory 203. In some alternative embodiments of the present invention, processor 202 might be a special-purpose processor.

Memory 203 stores the instructions and data used by processor 202, in well-known fashion. Memory 203 can be any combination of dynamic random-access memory (RAM), flash memory, disk drive memory, and so forth.

Figure 3:
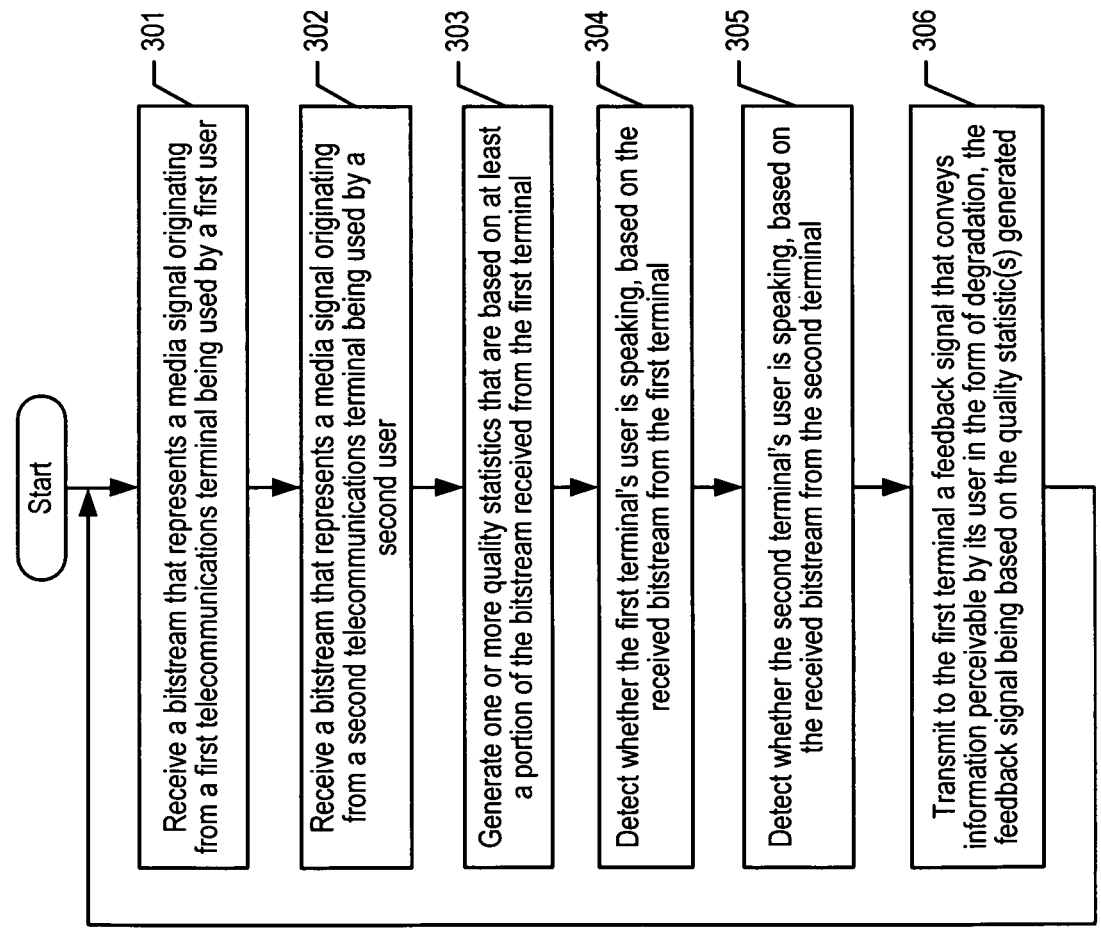
FIG. 3 depicts a flowchart of the salient tasks performed by data-processing system 104, in accordance with the illustrative embodiment of the present invention.

FIG. 3 depicts a flowchart of the salient tasks performed by data-processing system 104, in accordance with the illustrative embodiment of the present invention. As those who are skilled in the art will appreciate, some or all of the individual tasks depicted in FIG. 3 can be performed simultaneously or performed in a different order from that depicted.

For pedagogical purposes, an example is provided in which terminals 102 and 103 are exchanging, with each other, audio bitstreams that represent audio signals. Terminal 102 is a cell phone. The bitstreams are made available to data-processing system 104. However, it will be clear to those skilled in the art, after reading this specification, how to make and use alternative embodiments of the present invention. These alternative embodiments, for example, might involve the exchange of other types of media content such as video; more than two terminals communicating with one another, either as part of the same session or across multiple, simultaneous sessions; different types of telecommunications terminals than those in the illustrative embodiment; and/or a different type of data-processing system.

At task 301, system 104 receives a first bitstream that represents a media signal that originates from terminal 102. The first bitstream comprises media content that is originated, at least in part, by terminal 102's user. At least some of the bits in the first bitstream received by data-processing system 104 are also transmitted to terminal 103 and intended for its user.

In accordance with the illustrative embodiment, the first bitstream comprises audio information. In some alternative embodiments, the first bitstream might comprise video information, audio and video information, or some other type of media content. In still other, alternative embodiments, the first bitstream might also comprise information that is already being collected by network 101 about one or more portions of the communications path from terminal 102, such as bit error rate over the wireless link from terminal 102 to its current radio base station.

At task 302, system 104 also receives a second bitstream that represents a media signal that originates from terminal 103. The second bitstream comprises media content that is originated, at least in part, by terminal 103's user. At least some of the bits in the second bitstream received by data-processing system 104 are also transmitted to terminal 102 and intended for its user.

In accordance with the illustrative embodiment, the second bitstream comprises audio information. In some alternative embodiments, the second bitstream might comprise video information, audio and video information, or some other type of media content. In still other, alternative embodiments, the second bitstream might also comprise information that is already being collected by network 101 about one or more portions of the communications path from terminal 103.

At task 303, system 104 generates one or more quality statistics in well-known fashion, where each quality statistic generated is based on at least a portion of the first bitstream, which comprises media-content bits originating at terminal 102. Each quality statistic generated can be related to quality of service (QoS) or media waveform quality, which is sometimes referred to as quality of media (QoM). Quality statistics that are associated with quality of service are those which are a measure of the bandwidth, error rate, and/or latency from one node to another.

Quality statistics that are associated with media waveform quality are those which are a measure of how well a media signal that is received at a device compares with what is required to be received at that device, when assessed at the waveform level. A media signal can be an audio signal, a video signal, a modem traffic signal, a TTY signal, a facsimile signal, or some other signal that can be characterized as having a waveform. The device can be the intended destination of the media signal within a telecommunications system or it can be an intermediate node within the telecommunications system, such as data-processing system 104.

Waveform quality is distinguished from quality of service, which was defined earlier, in that quality of service is a measure that is performed at the bit or packet level. Waveform quality is a function of, but is not limited to, one or more of the following waveform characteristics:

i. loudness,
    ii. audio distortion,
    iii. noise,
    iv. fading,
    v. crosstalk,
    vi. echo, and
    vii. video distortion (e.g., spatial, temporal, optical, etc.).

As those who are skilled in the art will appreciate, quality statistics that are generated in accordance with the illustrative embodiment can also be related to other performance measures of signal quality not explicitly identified in this specification. Furthermore, in some alternative embodiments, some or all of the quality statistics can be generated from information that network 101 might already be collecting about one or more portions of the communications path from terminal 102 or terminal 103, or both, as described above and with respect to tasks 301 and 302. As such, data-processing system 104 might obtain these quality statistics from another source, instead of generating them itself.

At task 304, system 104 detects whether terminal 102's user is speaking. Voice-activity detection techniques can be used here and are well-known in the art. In some embodiments, system 104 detects specifically whether the user has begun speaking after not having spoken for a time, or whether the user has stopped speaking after having been speaking, or both. In some alternative embodiments, system 104 detects specifically whether terminal 102's user has been speaking for a first, predetermined time interval (e.g., one second, etc.), or whether the user has not been speaking for a second, predetermined time interval (e.g., one second, etc.), or both. The first and second predetermined time interval can be the same as or different from each other.

Similarly, at task 305, system 104 detects whether terminal 103's user is speaking. In some embodiments, system 104 detects specifically whether the user has begun speaking after not having spoken for a time, or whether the user has stopped speaking after having been speaking, or both. In some alternative embodiments, system 104 detects specifically whether terminal 103's user has been speaking for a first, predetermined time interval (e.g., one second, etc.), or whether the user has not been speaking for a second, predetermined time interval (e.g., one second, etc.), or both. The first and second predetermined time interval can be the same as or different from each other.

At task 306, system 104 transmits to terminal 102 a feedback signal that conveys information perceivable by terminal 102's user in the form of degradation being introduced to a pre-existing signal originating from terminal 103. The pre-existing signal is received at task 302. In accordance with the illustrative embodiment, the feedback signal is based on the quality statistic that was generated at task 303. For example, the feedback signal is in the form of noise added to the audio bitstream, in which the level of the noise that is added is a function of the value of the quality statistic.

The degradation is introduced by system 104 prior to the encoding and transmitting of the feedback signal to terminal 102. In some alternative embodiments, however, a control signal is instead transmitted to terminal 102, which signal conveys degradation information or instructions for the terminal to use in creating degradation for its user. In those alternative embodiments, terminal 102 then uses the control signal it receives to create the degradation itself.

In accordance with the illustrative embodiment, system 104 provides to terminal 102 the feedback signal as part of the audio bitstream from terminal 103. In other words, the audio bitstream originated by terminal 103's user is altered, based on the quality statistic that was generated at task 303. In accordance with the illustrative embodiment, system 104 intentionally degrades the audio bitstream, where the degradation is introduced in such a way that it is perceivable by terminal 102's user, but does not affect that user's ability to understand terminal 103's user.

In some embodiments, one or more characteristics of the feedback signal can also be based on whether terminal 102's user has begun speaking; has been speaking for the first, predetermined time interval; has stopped speaking; and/or has not been speaking for the second, predetermined time interval. For example, the feedback signal might convey audible information when terminal 102's user is speaking, but might comprise control signals that are used to flash a light on the terminal or to vibrate the terminal when the user is not speaking. Alternatively, the one or more characteristics of the feedback signal might be based on another characteristic of terminal 102 or its user which has not already been described, or on a characteristic of terminal 103 or its user.

Although the feedback signal in the illustrative embodiment is introduced in a pre-existing audio signal, it will be clear to those skilled in the art, after reading this specification, how to make and use alternative embodiments in which the feedback signal is added in a different type of pre-existing media signal, such as a video signal. For example, based on a quality statistic in the transmit audio path, system 104 might introduce degradation in the receive-path video, such as noise being added to the picture, a change in the color, contrast, sharpness, or brightness, and so forth. Generally-speaking, it will be clear to those skilled in the art, after reading this specification, how to make and use alternative embodiments in which the feedback signal is introduced in a first type of pre-existing media signal (e.g., audio, etc.) in the receive path, based on a quality statistic of a second type of media signal (e.g., video, etc.) in the transmit path, in which the first and second types of media signal can either be the same or different.

Other types of feedback signals that convey non-vocal audible information (tones), visible information on a display, tactile information via a vibration mechanism in the phone, etc. can be transmitted back to the terminal for the purpose of providing feedback to the terminal's user on how well terminal 103's user might be perceiving terminal 102's user's transmissions. In fact, in some alternative embodiments, the feedback signal might be provided in such a way to intentionally avoid degradation to any pre-existing signal from terminal 103.

In some embodiments, the actual transmitting of the feedback signal, in contrast to the characteristics of the feedback signal, can be based on whether terminal 103's user has begun speaking; has been speaking for the first, predetermined time interval; has stopped speaking; and/or has not been speaking for the second, predetermined time interval. For example, the feedback signal might be transmitted when terminal 103's user is not speaking, in which the feedback signal might be in the form of a crackling sound between the user's voice activity, but might not be transmitted when the user is speaking. As another example, the feedback signal might be transmitted when terminal 103's user is speaking, in which a synthetic, but natural-sounding noise is added to the audio bitstream. Alternatively, the transmitting of the feedback signal might be based on another characteristic of terminal 103 or its user which has not already been described, or on a characteristic of terminal 102 or its user.

Moreover, the actual transmitting of the feedback signal can be based on the value of the quality statistic generated, in some other embodiments. For example, transmitting of the feedback signal might occur only when the value of the quality statistic exceeds a predetermined threshold (e.g., 2% bit error rate, etc.). As those who are skilled in the art will appreciate, the threshold can be set at a point where a quality statistic value greater than that of the threshold denotes a marginal or unacceptable call quality.

In accordance with the illustrative embodiment, system 104 affects one or more characteristics of the audio in the receive path, based at least in part on one or more quality statistics for the audio in the corresponding transmit path for the same pair of terminals. However, it will be clear to those skilled in the art, after reading this specification, how to make and use alternative embodiments of the present invention in which the audio in the receive path is affected based on quality statistics for the audio transmitted over a non-corresponding path, such as an audio path between another pair of terminals, an audio path between terminal 102 and a third terminal, and so forth.

System 104 repeats the tasks described with respect to FIG. 3 throughout the call between terminals 102 and 103, sporadically or periodically, and also performs the described set of tasks concurrently for other calls involving other terminals. Furthermore, system 104 can also perform the tasks bi-directionally for a given call, so that the user of terminal 103 is also provided feedback on the quality that is being experienced by the user of terminal 102.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:
1. A method comprising:
receiving, at a data-processing system, a bitstream that represents a media signal originating from a first telecommunications terminal being used by a first user, at least some of the bits in the bitstream being transmitted to a second telecommunications terminal being used by a second user;
generating a quality statistic that is based on at least a portion of the bitstream received; and transmitting, to the first telecommunications terminal, a feedback signal that conveys information perceivable by the first user in the form of degradation being introduced to a pre-existing signal originating from the second telecommunications terminal, the feedback signal being based on the quality statistic, whereby the information conveyed provides the first user with feedback on the signal quality being experienced by the second user.

2. The method of claim 1 wherein the transmitting of the feedback signal is based on the value of the quality statistic generated.

3. The method of claim 2 wherein the transmitting of the feedback signal occurs only when the value of the quality statistic exceeds a predetermined threshold.

4. The method of claim 1 wherein the quality statistic is related to quality of service.

5. The method of claim 1 wherein the quality statistic is related to media waveform quality.

6. The method of claim 1 wherein the feedback signal is audio, and wherein the audio level of the feedback signal is based on the quality statistic.

7. The method of claim 1 further comprising detecting whether the second user is speaking, wherein the feedback signal is also based on the detecting.

8. The method of claim 7 wherein the transmitting of the feedback signal begins only after detecting that the second user is not speaking.

9. The method of claim 1 further comprising detecting whether the first user is speaking, wherein the feedback signal is also based on the detecting.

10. The method of claim 9 wherein the transmitting of the feedback signal begins only after detecting that the first user has begun speaking.

11. A method comprising:
receiving, at a data-processing system, an audio bitstream that represents an audio signal originating from a first telecommunications terminal being used by a first user, at least some of the bits in the bitstream being transmitted to a second telecommunications terminal;
generating a quality statistic that is based on at least a portion of the audio bitstream received;
detecting that the first user has begun speaking; and
transmitting, to the first telecommunications terminal, a feedback signal that conveys information perceivable by the first user in the form of degradation being introduced to a pre-existing signal originating from the second telecommunications terminal, the feedback signal being based i) on the quality statistic and ii) on detecting that the first user has begun speaking.

12. The method of claim 11 wherein the transmitting of the feedback signal begins only after detecting that the first user has been speaking for at least a predetermined time interval.

13. The method of claim 11 further comprising:
detecting, after the transmitting has begun, that the first user has stopped speaking; and
ceasing the transmitting of the feedback signal after detecting that the first user has stopped speaking.

14. The method of claim 11 wherein the transmitting of the feedback signal is based on the value of the quality statistic generated.

15. The method of claim 14 wherein the transmitting of the feedback signal occurs only when the value of the quality statistic exceeds a predetermined threshold.

16. A method comprising:
receiving, at a data-processing system, an audio bitstream that represents an audio signal originating from a first telecommunications terminal being used by a first user, at least some of the bits in the audio bitstream being transmitted to a second telecommunications terminal being used by a second user;
generating a quality statistic that is based on at least a portion of the audio bitstream received;
detecting that the second user, who had been speaking, has stopped speaking; and
transmitting, to the first telecommunications terminal, a feedback signal that conveys information perceivable to the first user in the form of degradation being introduced to a pre-existing signal originating from the second telecommunications terminal, the feedback signal being based i) on the quality statistic and ii) on detecting that the second user has stopped speaking.

17. The method of claim 16 wherein the feedback signal conveys crackling.

18. The method of claim 16 further comprising:
detecting, after the transmitting has begun, that the first user has begun speaking; and
ceasing the transmitting of the feedback signal after detecting that the first user has begun speaking.

19. The method of claim 16 wherein the transmitting of the feedback signal is based on the value of the quality statistic generated.

20. The method of claim 19 wherein the transmitting of the feedback signal occurs only when the value of the quality statistic exceeds a predetermined threshold.

* * * * *